(12) United States Patent
Cho et al.

(10) Patent No.: US 8,656,480 B2
(45) Date of Patent: Feb. 18, 2014

(54) METHOD FOR NEGOTIATING SECURITY-RELATED FUNCTIONS OF SUBSCRIBER STATION IN WIRELESS PORTABLE INTERNET SYSTEM

(75) Inventors: Seok-Heon Cho, Cheonrabuk-do (KR); Tae-Yong Lee, Gyeongsangnam-do (KR); Sun-Hwa Lim, Daejeon (KR); Chul-Sik Yoon, Daejeon (KR); Jun-Hyuk Song, Gyeonggi-do (KR); Ji-Cheol Lee, Gyeonggi-do (KR); Yong Chang, Seongnam (KR)

(73) Assignees: Samsung Electronics Co., Ltd (KR); Electronics and Telecommunications Research Institute (KR); KT Corporation (KR); SK Telecom Co., Ltd (KR); Hanaro Telecom., Inc. (KR)

( * ) Notice: Subject to any disclaimer, the term of this patent is extended or adjusted under 35 U.S.C. 154(b) by 868 days.

(21) Appl. No.: 11/908,932

(22) PCT Filed: Feb. 14, 2006

(86) PCT No.: PCT/KR2006/000514
§ 371 (c)(1),
(2), (4) Date: Apr. 9, 2008

(87) PCT Pub. No.: WO2006/098552
PCT Pub. Date: Sep. 21, 2006

(65) Prior Publication Data
US 2009/0119509 A1     May 7, 2009

Related U.S. Application Data

(60) Provisional application No. 60/663,348, filed on Mar. 17, 2005.

(51) Int. Cl.
*H04L 29/06* (2006.01)

(52) U.S. Cl.
USPC .............. 726/14; 380/247; 380/249; 380/270; 380/272; 713/168; 455/411

(58) Field of Classification Search
USPC .................... 726/14; 380/247–249, 270, 272; 713/155, 168; 455/411, 433
See application file for complete search history.

(56) References Cited

U.S. PATENT DOCUMENTS 5,764,770 A * 6/1998 Schipper et al. .............. 713/176
(Continued)

FOREIGN PATENT DOCUMENTS

EP     1 102 505    5/2001
(Continued)

OTHER PUBLICATIONS

Kaufman, C. et al., Network Security Private Communication in a Public World. Upper Saddle River, N.J., Prentice Hall, 2nd ed. Dec. 2008 p. 403-406.*

(Continued)

*Primary Examiner* — Justin T Darrow
(74) *Attorney, Agent, or Firm* — The Farrell Law Firm, P.C.

(57) ABSTRACT

The present invention relates to a subscriber station security-related parameter negotiation method in a wireless portable Internet system. The subscriber station security-related parameter negotiation method includes security-related parameters in transmitting/receiving basic capability negotiation request messages and basic capability negotiation response messages such that the subscriber station and the base station negotiate the subscriber station security-related parameters. The security-related parameters include an authorization policy support subfield used to negotiate an authorization policy between the subscriber station and the base station, and message authentication code mode subfields used to negotiate a message authentication code mode. The base station can inform the subscriber station that authentication or message authentication is not performed and is omitted according to a service provider policy by writing it on the authorization policy support subfield or message authentication code mode subfield. In addition, the subscriber station and the base station can select an authorization policy formed with at least one combination through the authorization policy support subfield of the security negotiation parameters. According to the present invention, the service provider of the wireless portable Internet system can more efficiently and flexibly manage the system by providing a scheme for omitting an authentication function and a message authentication function as well as for supporting various authorization policies and message authentication functions.

19 Claims, 7 Drawing Sheets

| Case | Value | | | Description |
|---|---|---|---|---|
| | Bit #0/ Bit #4 | Bit #1/ Bit #5 | Bit #2/ Bit #6 | |
| 1 | 0 | 0 | 0 | No Authorization |
| 2 | 0 | 0 | 1 | N/A |
| 3 | 0 | 1 | 0 | EAP-based authorization |
| 4 | 0 | 1 | 1 | EAP-based authorization and Authenticated EAP-based authorization |
| 5 | 1 | 0 | 0 | RSA-based authorization |
| 6 | 1 | 0 | 1 | RSA-based authorization and Authenticated EAP-based authorization |
| 7 | 1 | 1 | 0 | RSA-based authorization and EAP-based authorization |
| 8 | 1 | 1 | 1 | N/A |

(56) References Cited

U.S. PATENT DOCUMENTS

| | | | |
|---|---|---|---|
| 6,134,434 | A | 10/2000 | Krishnamurthi et al. |
| 7,441,043 | B1* | 10/2008 | Henry et al. ............... 709/238 |
| 2001/0002929 | A1* | 6/2001 | Mache ......................... 380/247 |
| 2003/0033518 | A1 | 2/2003 | Faccin et al. |
| 2004/0068668 | A1* | 4/2004 | Lor et al. .................... 713/201 |
| 2004/0103282 | A1* | 5/2004 | Meier et al. ................. 713/171 |
| 2004/0184605 | A1* | 9/2004 | Soliman ........................ 380/44 |
| 2005/0083947 | A1* | 4/2005 | Vaarala et al. ........... 370/395.51 |
| 2005/0132214 | A1* | 6/2005 | Naftali ........................ 713/200 |
| 2005/0250499 | A1 | 11/2005 | Lee et al. |
| 2006/0004771 | A1* | 1/2006 | Enenkiel ....................... 707/10 |
| 2006/0031685 | A1* | 2/2006 | Chen et al. .................. 713/190 |
| 2006/0080459 | A1* | 4/2006 | Nanri .......................... 709/237 |

FOREIGN PATENT DOCUMENTS

| | | | |
|---|---|---|---|
| JP | 11-274999 | 10/1999 | |
| JP | 2002-152180 | 5/2002 | |
| JP | 2005-063132 | 3/2005 | |
| KR | 1020040055477 | 6/2004 | |
| KR | 1020050041864 | 5/2005 | |
| KR | 1020050050795 | 6/2005 | |
| KR | 1020050053857 | 6/2005 | |
| KR | 1020050109685 | 11/2005 | |
| WO | WO 2004040861 A1 * | 5/2004 | ............. H04L 12/56 |

OTHER PUBLICATIONS

Seokheon Cho et al., "Security Negotiation Parameters in the SBC-REQ/RSP Procedure", IEEE 802.16 Broadband Wireless Access Working Group, Mar. 9, 2005.
Junhyuk Song et al., "Clarification for Authorization Policy", IEEE 802.16 Broadband Wireless Access Working Group, Jul. 14, 2005.
VPN, Network World, vol. 9, No. 4, Japan, IDG Japan Corp., Apr. 1, 2004.
Itoh Masashi, Truth of IPsec & SSL-VPN, Network Magazine, vol. 9, No. 4, Japan, ASCII Inc., Apr. 1, 2004.
Susie Wee et al., "Secure Transcoding with JPSEC Confidentiality and Authentication", 2004 International Conference on Image Processing (ICIP), Oct. 24, 2004, vol. 1, pp. 577-580.
Kaoru Kurosawa, Lecture Series of Electronic Information and Communication D-8 Mathematical Foundation of Modern Cryptography, Japan, Corona Publishing Co., Ltd., Mar. 31, 2004, pp. 34-35.
Chi-Chen Lee et al., "A New Method to Enhance the Network Entry and Re-Entry Procedures in PMP Mode", IEEE 802.16 Broadband Wireless Access Working Group, Nov. 17, 2004.
David Johnston et al., Overview of IEEE 802.16 Security, Making Wireless Work, IEEE Security & Privacy, Jun. 21, 2004.
Jeff Mandin, "EAP Keying for PKMv2", IEEE 802.16 Working Group, Aug. 31, 2004.
Jeff Mandin, "802.16e Privacy Key Management (PKM) Version 2", IEEE 802.16 Broadband Wireless Access Working Group, Jul. 8, 2004.
Robert J. Guice et al., "IEEE 802.16 Commercial Off the Shelf (COTS) Technologies as a Compliment to Ship to Objective Maneuver (STOM) Communications", Sep. 2004.

* cited by examiner

| Type | Length | Value | Scope |
|------|--------|-------|-------|
| 25 | Variable | Including a plurality of subfields | SBC-REQ, SBC-RSP |

FIG.3

| Attribute | Contents |
|---|---|
| PKM version support | Version of privacy sublayer supported |
| Authorization policy support | Authorization policy to support |
| Message authentication code mode | Message authentication code to support |
| PN window size | Size capability of the receiver PN window per SAID |

FIG.4

| Type | Length | Value |
|---|---|---|
| 25.1 | 1 | Bit# 0:PKM version 1 |
| | | Bit# 1: PKM version 2 |
| | | Bit# 2-7: Reserved. Set to 0. |

FIG.5

| Type | Length | Value |
|---|---|---|
| 25.2 | 1 | Bit# 0: RSA-based authorization at the initial network entry |
| | | Bit# 1: EAP-based authorization at the initial network entry |
| | | Bit# 2: Authenticated EAP-based authorization at the initial network entry |
| | | Bit# 3: Reserved. Set to 0. |
| | | Bit# 4: RSA-based authorization at the re-entry |
| | | Bit# 5: EAP-based authorization at the re-entry |
| | | Bit# 6: Authenticated EAP-based authorization at the re-entry |
| | | Bit# 7: Reserved. Set to 0. |

FIG.6

| Case | Value | | | Description |
|---|---|---|---|---|
| | Bit #0/ Bit #4 | Bit #1/ Bit #5 | Bit #2/ Bit #6 | |
| 1 | 0 | 0 | 0 | No Authorization |
| 2 | 0 | 0 | 1 | N/A |
| 3 | 0 | 1 | 0 | EAP-based authorization |
| 4 | 0 | 1 | 1 | EAP-based authorization and Authenticated EAP-based authorization |
| 5 | 1 | 0 | 0 | RSA-based authorization |
| 6 | 1 | 0 | 1 | RSA-based authorization and Authenticated EAP-based authorization |
| 7 | 1 | 1 | 0 | RSA-based authorization and EAP-based authorization |
| 8 | 1 | 1 | 1 | N/A |

FIG.7

| Type | Length | Value |
|------|--------|-------|
| 25.3 | 1 | Bit# 0: HMAC |
| | | Bit# 1: OMAC |
| | | Bit# 2: 64-bit short-HMAC |
| | | Bit# 3: 80-bit short-HMAC. |
| | | Bit# 4: 96-bit short-HMAC |
| | | Bit# 5-7: Reserved. Set to 0. |

METHOD FOR NEGOTIATING SECURITY-RELATED FUNCTIONS OF SUBSCRIBER STATION IN WIRELESS PORTABLE INTERNET SYSTEM

BACKGROUND OF THE INVENTION (a) Field of the Invention

The present invention relates to a subscriber station security-related parameter negotiation method in a wireless portable Internet system, and it more particularly relates to a subscriber station security-related parameter negotiation method for efficiently supporting and managing various authorization policies and message authentication schemes in a wireless portable Internet system.

(b) Description of the Related Art

A wireless portable Internet is a next-generation communication system to further support mobility in local area data communication such as in a conventional wireless local access network (LAN) that uses a fixed access point. Various wireless portable Internet standards have been proposed, and the international standard of the portable Internet has progressed on the IEEE 802.16e. The above-described IEEE 802.16 supports a metropolitan area network (MAN) representing an information communication network covering the LAN and the wide area network (WAN).

In authorization policies of such an IEEE 802.16 wireless MAN-based wireless portable Internet system, RSA (Rivest Shamir Adleman)-based authentication and EAP (Extensible Authentication Protocol)-based authentication are supported. In addition, a subscriber station and a base station perform a negotiation regarding these two authentication schemes through a subscriber station basic capability negotiation process performed during an initial network entry process. At this time, the subscriber station informs the base station of all available subscriber station-supportable authentication schemes, i.e., two authentication schemes in this case, by transmitting one of MAC (Message Authentication Code) messages of the IEEE 802.16 standard protocol, that is, a SBC-REQ (Subscriber station Basic Capability Request) message, to the base station. Here, the authentication includes subscriber station equipment authentication, base station equipment authentication, and user authentication.

Meanwhile, the base station receiving the SBC-REQ message performs a negotiation by comparing the subscriber station-informed authentication schemes with base station-supportable authentication schemes. Thereafter, the base station informs the subscriber station of the negotiated authentication schemes by transmitting a MAC message, that is, an SBC-RSP (Subscriber station Basic Capability Response) message. The subscriber station and the base station perform a subscriber station authentication function through the authentication scheme negotiated in such a manner.

However, according to the conventional method, either the only RSA-based authentication scheme or the only EAP-based authentication scheme is supported. Accordingly, it is necessary to more efficiently support various other authentication schemes that are not supported currently. In addition, such an authentication function must be omitted so as to enhance system performance according to a provider policy of the wireless portable Internet system. However, according to the conventional method, there is a problem in that the authentication function cannot be omitted.

Meanwhile, when the subscriber station authentication function is performed in the wireless portable Internet system, a message authentication function for all the control messages communicated between the subscriber station and the base station may be supported.

The subscriber station and the base station representatively use an HMAC (Hashed Message Authentication Code) and a CMAC (Cipher-based Message Authentication Code) so as to perform such a message authentication. The HMAC has various sizes to be used for authenticating control messages exchanged between the subscriber station and the base station when the subscriber station performs the network re-entry process or a handover process. However, the conventional wireless portable Internet system has a problem in that a method being capable of selecting various message authentication schemes or omitting a message authentication function is not defined.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a subscriber station security-related parameter negotiation method in a wireless portable Internet system having advantages of supporting various authorization policies and message authentication schemes and omitting an authentication function or a message authentication function according to a provider policy.

An exemplary embodiment of the present invention provides a subscriber station security-related parameter negotiation method in a wireless portable Internet system.

The subscriber station security-related parameter negotiation method is a method that a subscriber station negotiates security-related parameters with a base station in a wireless portable Internet system, and includes a) transmitting a basic capability negotiation request message for negotiating the subscriber station security-related parameters to the base station, the basic capability negotiation request message including security negotiation parameters on which subscriber station-supportable security-related functions are written; and b) receiving a basic capability negotiation response message that is transmitted from the base station in response to the transmitted basic capability negotiation request message, the basic capability negotiation response message including security negotiation parameters on which the base station-negotiated security-related functions are written, wherein the security negotiation parameters included in the basic capability negotiation response message, support an authentication function for omitting the subscriber station equipment authentication, the base station equipment authentication, and the user authentication.

At this time, the security negotiation parameters included in the basic capability negotiation response message may support a message authentication function for omitting authentication for messages transmitted between the subscriber station and the base station.

In addition, the subscriber station security-related parameter negotiation method may support various message authentication code modes for the message authentication.

Another embodiment of the present invention provides a subscriber station security-related parameter negotiation method in a wireless portable Internet system.

The subscriber station security-related parameter negotiation method is a method that a base station negotiates a security-related parameters with a subscriber station in a wireless portable Internet system, and the subscriber station security-related parameter negotiation method includes a) receiving a basic capability negotiation request message for negotiating the subscriber station security-related parameters from the subscriber station, the basic capability negotiation request message including security negotiation parameters on which the subscriber station-supportable security-related functions are written; and, b) performing a comparison and negotiation between the subscriber station-supportable security-related functions written on the received security negotiation parameters and the base station-supportable security-related functions and transmitting a basic capability negotiation response message including the security negotiation parameters on which the negotiated result is written, wherein the security negotiation parameters included in the basic capability negotiation response message support an authentication function for omitting the subscriber station equipment authentication, the base station equipment authentication, and the user authentication.

At this time, the security negotiation parameters included in the basic capability negotiation response message may support a message authentication function for omitting authentication for messages transmitted between the subscriber station and the base station.

In addition, the subscriber station security-related parameter negotiation method can support various message authentication code modes for the message authentication.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise" or variations such as "comprises" or "comprising" will be understood to imply the inclusion of stated elements but not the exclusion of any other elements.

A subscriber station security-related parameter negotiation method in a wireless portable Internet system according to an exemplary embodiment of the present invention will be described with reference to the drawings.

A power source is first supplied to the subscriber station, and the subscriber station starts an initial network entry process with the base station, sets downlink synchronization with the base station, and obtains an uplink parameter. Such an uplink parameter may include a channel descriptor message corresponding to a physical layer characteristic (e.g., signal-to-noise ratio (SNR)).

Thereafter, the subscriber station and the base station perform a wireless link initial network entry, that is, a ranging process, and perform a subscriber station basic capability negotiation process after finishing such a ranging process. The subscriber station and the base station agree on various physical layer concerning parameters through such a subscriber station basic capability negotiation process. In addition, the subscriber station and the base station agree on the security-related parameters through such a subscriber station basic capability negotiation process. Here, the negotiated parameters include a PKM (Privacy Key Management) version, an authorization policy, and a message authentication function.

Figure 1:
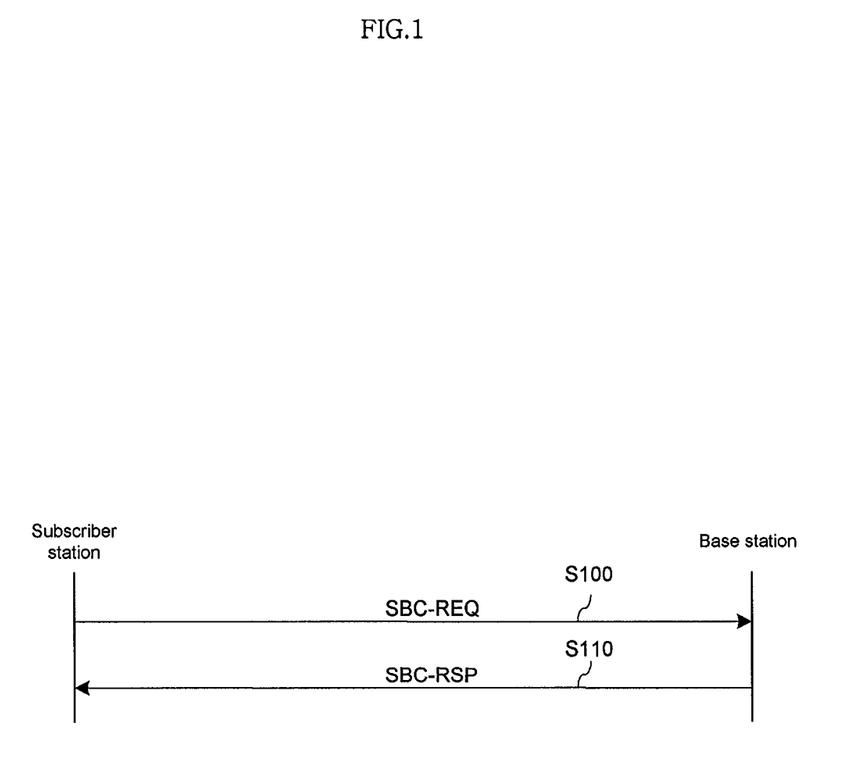
FIG. 1 is a flowchart showing a subscriber station basic capability negotiation process for negotiating subscriber station security-related parameters in a wireless portable Internet system according to an exemplary embodiment of the present invention.

FIG. 1 is a flowchart showing a subscriber station basic capability negotiation process for negotiating subscriber station security-related parameters in a wireless portable Internet system according to an exemplary embodiment of the present invention.

Referring to FIG. 1, when the subscriber station and the base station finish a ranging process, a subscriber station basic capability negotiation process including an authentication scheme negotiation process to authenticate a subscriber station is performed.

Firstly, the subscriber station transmits a subscriber station basic capability negotiation request (SBC-REQ) message to the base station so as to negotiate basic capabilities, particularly, the subscriber station security-related parameters (S100), in which the subscriber station basic capability negotiation request (SBC-REQ) message is one of the MAC messages of the IEEE 802.16 standard protocol.

Here, the SBC-REQ message includes parameters including all subscriber station-supportable information. Particularly, the subscriber station transmits the SBC-REQ message including all the subscriber station-supportable security parameters through the security negotiation parameters field to the base station. Such a security negotiation parameters field includes a plurality of subfields for expressing PKM version support, authentication policy support, message authentication code mode, etc. Such subfields will be described in detail hereinafter.

The subscriber station can inform of the various subscriber station-supportable authentication polices and message authentication code modes through the subfields of the SBC-REQ message to the base station.

Next, the base station receives the SBC-REQ message from the subscriber station and performs a basic capability negotiation so as to authenticate the subscriber station, in which the basic capability negotiation is previously defined in the IEEE 802.16 standard, and simultaneously determines final values by comparing the security negotiation parameters field included in the SBC-REQ message with a base station-supportable security negotiation parameters field. At this time, the base station can select various authentication schemes other than one of the RSA-based authentication and the EAP-based authentication schemes that the base station conventionally selects from. For example, the base station may determine an authorization policy such that the subscriber station authentication function is not performed, such as when the subscriber station authentication function is omitted according to the provider policy of the wireless portable Internet system. In addition, the base station may select more various message authentication code modes than just the HMAC or the CMAC. For example, in such a manner as in the authorization policy, the base station may determine a message authentication code mode for omitting the message authentication function depending on the service provider policy of the wireless portable Internet system.

As such, the base station transmits the negotiated security negotiation parameters field to the subscriber station through one of the MAC messages of the IEEE 802.16 standard protocol through a subscriber station basic capability negotiation response (SBC-RSP) message (S110).

As a result, the subscriber station and the base station finish a subscriber station basic capability negotiation process therebetween, and accordingly, they share the negotiated subscriber station security-related parameters.

Figure 2:
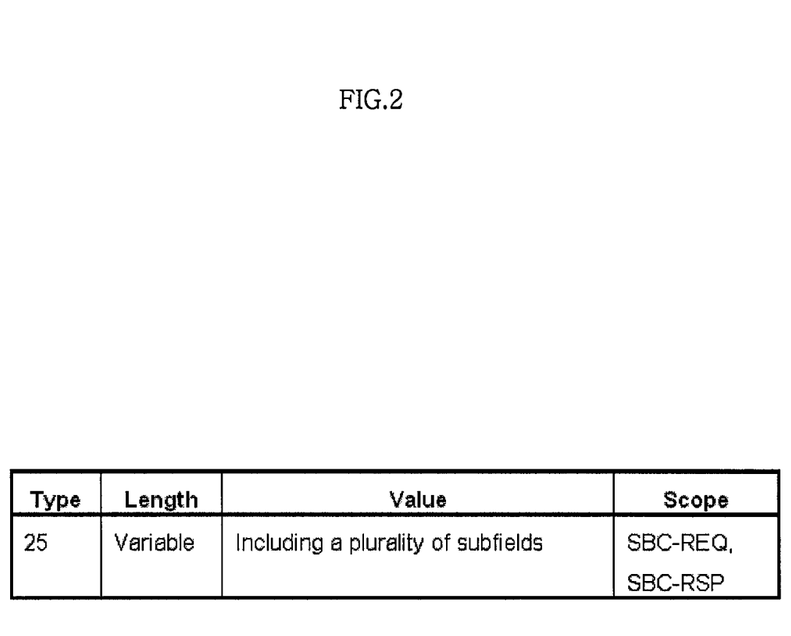
FIG. 2 is a table showing security negotiation parameters field provided by a subscriber station security-related parameter negotiation method of a wireless portable Internet system according to an exemplary embodiment of the present invention.

FIG. 2 is a table showing security negotiation parameters provided by a subscriber station security-related parameter negotiation method of a wireless portable Internet system according to an exemplary embodiment of the present invention.

As described above, the subscriber station and the base station perform the subscriber station basic capability negotiation process by exchanging the SBC-REQ and SBC-RSP messages. At this time, the SBC-REQ and SBC-RSP messages include the security negotiation parameters field therein so as to perform the subscriber station security-related parameter negotiation.

This security negotiation parameters field includes a plurality of subfields. In addition, the security negotiation parameters field is given as Type 25 and has a flexible length depending on how many subfields are included therein.

Figure 3:
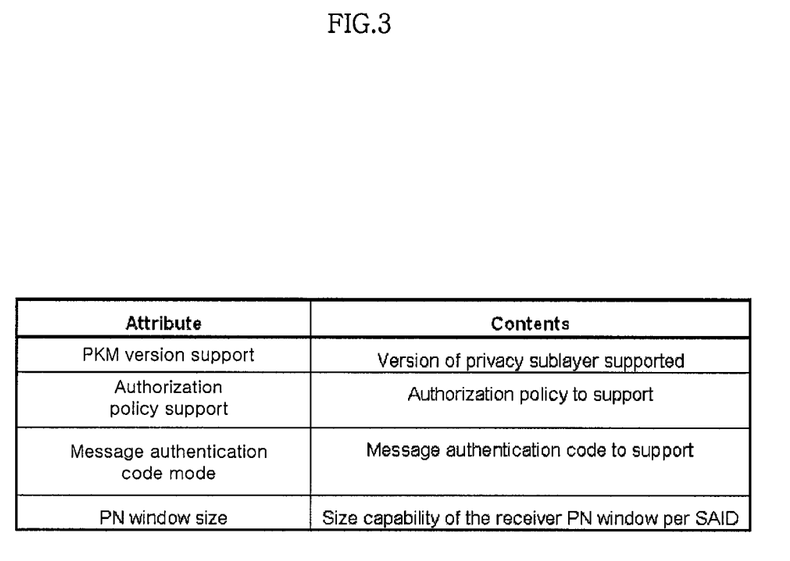
FIG. 3 is a table showing a configuration of a security negotiation parameters field shown in FIG. 2.

FIG. 3 is a table showing a configuration of a security negotiation parameters field shown in FIG. 2.

Referring to FIG. 3, the security negotiation parameters field includes the plurality of subfields. These subfields must be negotiated between the subscriber station and the base station before the actual subscriber station authorization, that is, authentication, is performed. That is, these subfields must be negotiated during the subscriber station basic capability negotiation process. Such subfields include a PKM version support, an authorization policy support, a message authentication code mode, and a PN window size.

The PKM version support subfield is used to negotiate a PKM version between the subscriber station and the base station. The PKM is a privacy key management protocol defining a security layer in the IEEE 802.16 standard protocol. There are a PKMv1 for expressing a PKM version 1 and a PKMv2 for expressing a PKM version 2.

The authorization policy support subfield is used to negotiate an authorization policy between the subscriber station and the base station. Through this subfield, the subscriber station and the base station may select various authorization policies, and may also omit the subscriber station authentication function depending on the service provider policy of the wireless portable Internet system. Herein, the authentication function includes a subscriber station equipment authentication function, a base station equipment authentication function, and a user authentication function.

The message authentication code mode (MAC Mode) subfield is used to negotiate authentication schemes for all control messages exchanged between the subscriber station and the base station. Through this subfield, the message authentication function may be omitted between the subscriber station and the base station, and also, one scheme selected from among the various message authentication schemes may be performed when the message authentication function is not omitted.

The PN (packet number) window size subfield is used to negotiate a received PN window size for the respective SAs (security associations).

Figure 4:
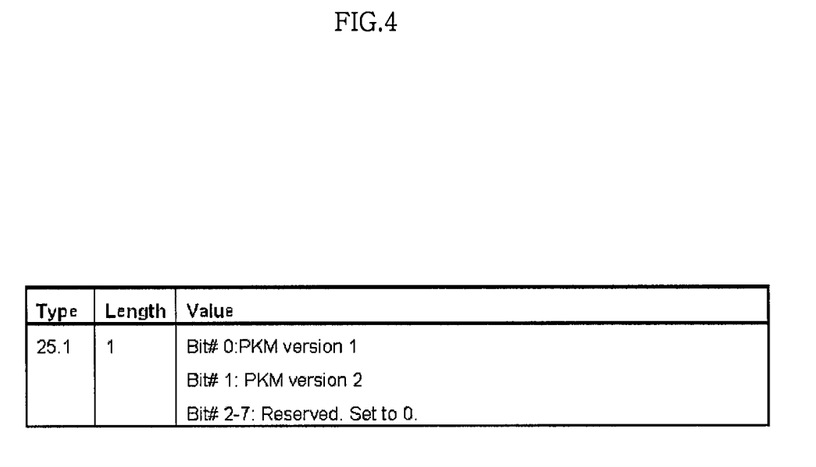
FIG. 4 is a table showing a PKM version support sub-field shown in FIG. 3.

FIG. 4 is a table showing a PKM version support sub-field shown in FIG. 3.

As shown in FIG. 4, the PKM version support subfield is given as one subfield included in the security negotiation parameters field as described above, and is used to negotiate the PKM version. In other words, the subscriber station and the base station select either PKM version1 or PKM version 2 using the PKM version support subfield. This subfield has Field Type 1, and accordingly, the subfield is defined as Type 25.1 involving the security negotiation parameters field and has a 1-byte length.

Among the 1-byte of such a PKM version support subfield, a 0-th bit (Bit#0) and a first bit (Bit#1) are actually used and other bits (Bit#2 to 7) are not used and are set as 0. Here, when the 0-th bit (Bit#0) indicates the PKM version 1, the bit (Bit#1) indicates the PKM version 2, and it is indicated that the corresponding PKM version is supported in the case that the respective bits (Bit#0, 1) are set as 1.

Therefore, the subscriber station may be written on the PKM version support subfield in three manners, of which the subscriber station may support only the PKM version 1 (Bit#0=1, Bit#1=0), only the PKM version 2 (Bit#0=0, Bit#1=1), and both of the PKM version 1 and PKM version 2 (Bit#0=1, Bit#1=1).

Referring to FIG. 1, the subscriber station informs all the subscriber station-supportable PKM versions to the base station by transmitting the SBC-REQ message including the PKM version support subfield on which all the subscriber station-supportable PKM versions are written to the base station (S100). The base station transmits the negotiated PKM version to the subscriber station by comparing the received PKM version with a base station-supportable PKM version, negotiating this parameter, and transmitting the SBC-RSP message including the PKM version support subfield on which the negotiated PKM version is written to the subscriber station (S110).

As such, the authorization for a subscriber station, that is, subscriber station authentication process, is performed using the PKM version negotiated and shared between the subscriber station and the base station. Therefore, when not-negotiated PKM version's messages excluding the negotiated PKM version's messages are received, the base station does not perform a subscriber station authentication process, but discard the received messages.

Figure 5:
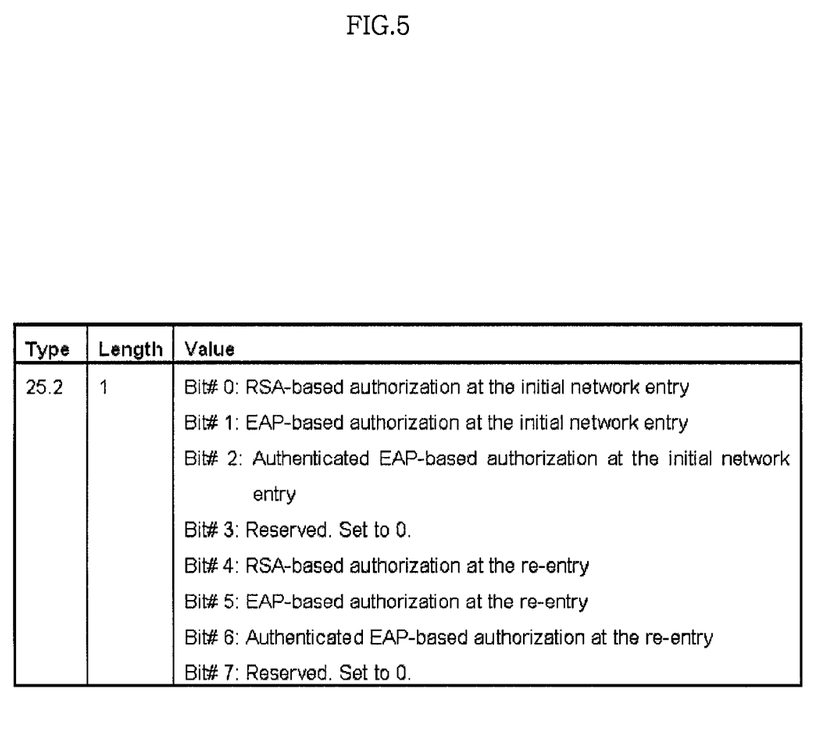
FIG. 5 is a table showing an authorization policy support subfield shown in FIG. 3.

FIG. 5 is a table showing an authorization policy support subfield shown in FIG. 3.

The authorization policy support subfield as shown in FIG. 5 is given as one subfield included in the security negotiation parameters field as described above, and is used to negotiate an authorization policy. In the wireless portable Internet system according to an exemplary embodiment of the present invention, largely, three authentication schemes, that is, an RSA-based authorization scheme, an EAP-based authorization scheme, and an authenticated EAP-based authorization scheme accompanying a message authentication function using keys allocated through the RSA-based authentication scheme or the EAP-based authentication scheme. That is, the subscriber station and the base station use the authorization policy support subfield so as to select at least one authentication scheme among the three authentication schemes. The authorization policy support subfield has Field Type 2, and accordingly, the subfield is defined as Type 25.2 involving the security negotiation parameters field and has a 1-byte length.

Such an authorization policy support subfield is defined only when the subscriber station or the base station supports the PKM version 2. The negotiated authorization policy is the only RSA-based authentication scheme in the case that the subscriber station or the base station supports the PKM version 1.

Among the 1 byte of the authorization policy support subfield, effective bits are given as from 0-th bit (Bit#0) to second bit (Bit#2) for an initial network entry process. In addition, the effective bits are given as from 4-th bit (Bit#4) to 6-th bit (Bit#6) when the subscriber station performs a network re-entry process or a handover process. The third (Bit#3) and 7-th bits (Bit#7) are not used and are set as 0. Here, the 0-th (Bit#0) and 4-th bits (Bit#4) indicate the RSA-based authorization, the first (Bit#1) and 5-th bits (Bit#5) indicate the EAP-based authorization, the second (Bit#2) and 6-th bits (Bit#6) indicate the authenticated EAP-based authorization, and it is indicated that the corresponding authorization policy is supported when the respective bits (from Bit#0 to Bit#2, from Bit#4 to Bit#6) are set as 1.

Therefore, when the subscriber station is performing the initial network entry process, the subscriber station sets a value 1 for the authentication polices that the authentication process can support during the initial network entry through the lower 3 bits (Bit#0 to Bit#2) of the subfield, and sets 0 for the authentication polices that the subscriber station cannot support.

In addition, the subscriber station sets 1 for the authentication polices that the subscriber station can support during the network re-entry process or the handover process through the upper 3 bits (from Bit#4 to Bit#6) of the subfield, and sets 0 for the authentication polices that the subscriber station cannot support.

Referring to FIG. 1, the subscriber station informs all the subscriber station-supportable authorization polices to the base station by transmitting the SBC-REQ message including the authorization policy support subfield on which all the supportable authorization polices are written (S100).

The base station receives the SBC-REQ message and negotiates this parameter by comparing the received 3 lower bits (from Bit#0 to Bit#2) of the authorization policy support subfield with the base station-supportable authorization policy. In addition, since the upper 3 bits (from Bit#4 to Bit#6) of the authorization policy support subfield are authorization policies that the subscriber station requests to be used on trying a network re-entry or a handover, these bits are not negotiated but are separately managed by the base station and then informed to the adjacent base stations when the subscriber station requests a handover.

The base station transmits the negotiated authorization policy to the subscriber station by transmitting the SBC-RSP message including the authorization policy support subfield on which the negotiated authorization policy are written (S110). At this time, the lower 3 bits (from Bit#0 to Bit#2) of the authorization policy support subfield included in the SBC-RSP message (S110) indicates an authorization policy to be used on performing the authentication process of the initial network entry process, and other bits (from Bit#3 to Bit#7) thereof are set as 0.

In an exemplary embodiment of the present invention, the subscriber station authorization function may be omitted when system performance enhancement is required depending on the service provider policy of the wireless portable Internet system. At this time, all values of the authorization policy support subfield included in the SBC-RSP message (S110) that the base station transmits to the subscriber station are set as 0. That is, the base station informs the subscriber station that the subscriber station authentication function is omitted depending on the service provider policy by setting all bits of the transmitted authorization policy support subfield as 0. In this case, the subscriber station does not performs a subscriber station authorization process, but performs a registration process for directly registering the subscriber station on the base station.

Meanwhile, when there is an authorization policy support subfield in the SBC-REQ message (S100) that the subscriber station transmits to the base station, the SBC-RSP message to transmit from the base station to subscriber station in response to this message shall include an authorization policy support subfield (S110).

When there is no authorization policy support subfield in the SBC-REQ message (S100) that the subscriber station transmits to the base station, it means the subscriber station supports the only RSA-based authorization policy. In this case, there may be no negotiated authorization policy support subfield in the SBC-RSP message (S110) that the base station transmits to the subscriber station, and the negotiated authorization policy between the subscriber station and the base station is the RSA-based authorization policy. When there is a negotiated authorization policy support subfield in the SBC-RSP message (S110) that the base station transmits to the subscriber station, either the negotiated RSA-based authorization policy or no authorization policy is selected. The 0-th bit (Bit#0) is set as 1 for such a result as when the RSA-based authorization policy is negotiated and the result is transmitted to the subscriber station. It will be described thereafter for such a result as when the authorization policy is omitted.

Various authentication processes, that is, the subscriber station equipment authentication or the base station equipment authentication or the user authentication, are performed according to the authorization policy shared and negotiated between the subscriber station and the base station. Therefore, when the received authentication-related message is not corresponding to the negotiated authorization policy, the base station does not perform a subscriber station authentication process, and discards the received message.

Figure 6:
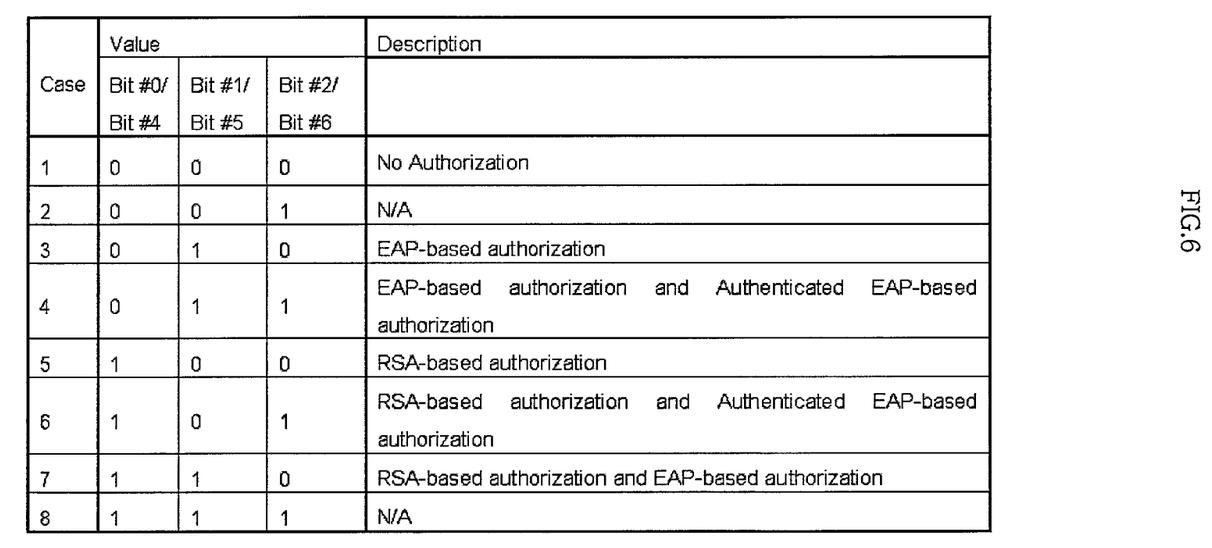
FIG. 6 is a table of all combined authorization policies that are capable of being negotiated using the authorization policy support subfield shown in FIG. 5.

FIG. 6 is a table of all combined authorization policies that are capable of being negotiated using the authorization policy support subfield shown in FIG. 5.

In the IEEE 802.16 wireless MAN-based wireless portable Internet system, the authorization policies includes the combination of three authentication schemes (the RSA-based authentication scheme, the EAP-based authorization scheme, and the authenticated EAP-based authorization scheme) as described above. The subscriber station and the base station negotiate the combination of three authentication schemes while the subscriber station basic capability negotiation is performed, and the base station performs the subscriber station authentication.

The lower 3 bits (from Bit#0 to Bit#2) of the authorization policy support subfield are used for the authentication process of the initial network entry, and the upper 3 bits (from Bit#4 to Bit#6) of the authorization policy support subfield are used for the authentication process of the network re-entry or handover process.

As such, there are eight supportable authorization policies using the respective bits of the authorization policy support subfield, as shown in FIG. 6.

The cases 3, 4, 5, 6, and 7 among these eight cases may be applied for the authorization policy support subfield included in the SBC-REQ message that the subscriber station transmits to the base station (S100). The case 1 which means the authentication function is not supported may not be applied because the subscriber station must support at least one authorization policy. In addition, the cases 2 and 8 may not be applied because they are not supported by the present security key management protocol (PKM version 2).

Meanwhile, the base station receives the SBC-REQ message, negotiates the authorization policy support subfield, and completes the subscriber station basic capability negotiation by transmitting the SBC-RSP message (S110) including this subfield to the subscriber station. The authorization policy support subfield included in the SBC-RSP message provides the negotiated authorization policy used for the authentication process of the initial network entry process. That is, the upper 3 bits (from Bit#4 to Bit#6) are set as 0 and only the lower 3 bits (from Bit#0 to Bit#2) became effective values.

In addition, the authentication function may be omitted when the system performance is considered according to the service provider policy of the wireless portable Internet system. At this time, all of the lower 3 bits (from Bit#0 to Bit#2) of the authorization policy support subfield are set as 0.

For example, the lower 3 bits (from Bit#0 to Bit#2) of the authorization policy support subfield are set in such a manner as the case 3 when the base station finally selects the only EAP-based authorization scheme as the authorization policy.

In addition, the lower 3 bits (from Bit#0 to Bit#2) of the authorization policy support subfield are set in such a manner as the case 4 when the base station finally selects the authorization policy for supporting the EAP-based authentication scheme and then the authenticated EAP-based authentication scheme based on result of the previously performed EAP-based authentication scheme.

In addition, the lower 3 bits (from Bit#0 to Bit#2) of the authorization policy support subfield are set in such a manner as the case 5 when the base station finally selects the authorization policy for supporting the only RSA-based authentication scheme.

In addition, the lower 3 bits (from Bit#0 to Bit#2) of the authorization policy support subfield are set in such a manner as the case 6 when the base station finally selects the authorization policy for supporting the RSA-based authentication scheme and then the authenticated EAP-based authentication based on result of the previously performed RSA-based authentication scheme.

In addition, the lower 3 bits (from Bit#0 to Bit#2) of the authorization policy support subfield are set in such a manner as the case 7 when the base station finally selects the authorization policy for supporting the RSA-based authentication scheme and then the authenticated EAP-based authentication.

As described above, the cases 2 and 8 may be not applied because they are not supported by the present security key management protocol (PKM).

The subscriber station and the base station negotiate the authorization policy to be used for the authorization process of the initial network entry process. The subscriber station and the base station perform an authentication process according to the negotiated authorization policy, and the base station discards the corresponding message when the not-negotiated authorization policy concerning message is received.

Figure 7:
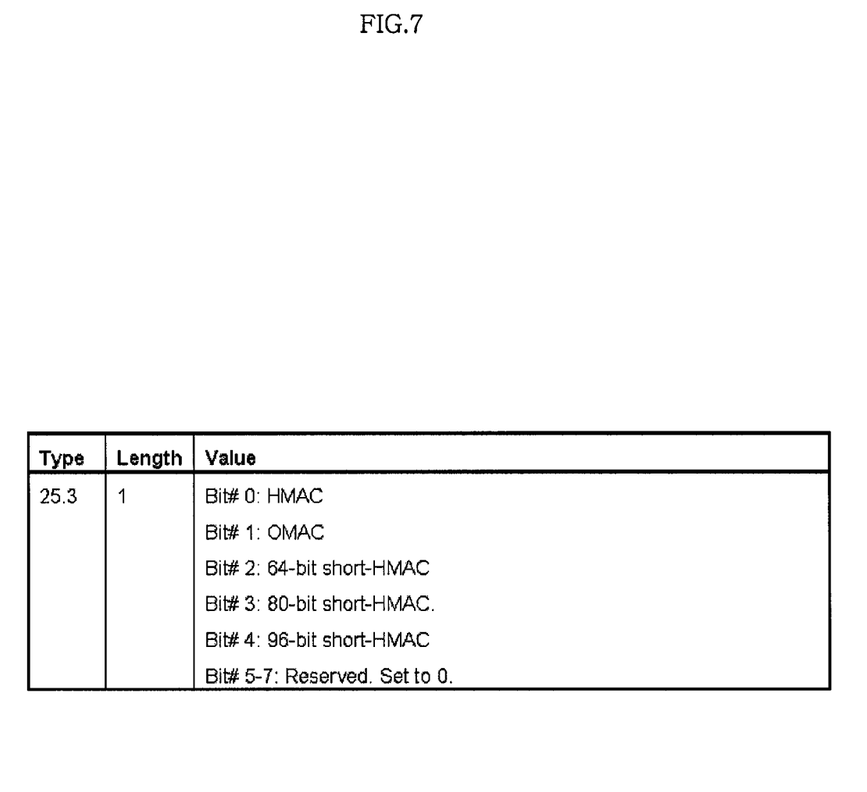
FIG. 7 is a table showing a message authentication code mode subfield shown in FIG. 3.

FIG. 7 is a table showing a message authentication code mode subfield shown in FIG. 3.

The message authentication code mode subfield as shown in FIG. 7 is given as one subfield that is included in the security negotiation parameters field as described above and is used to negotiate a message authentication scheme.

In the wireless portable Internet system according to an exemplary embodiment of the present invention, the message authentication code mode includes HMAC, CMAC, and various short-HMACs. That is, the subscriber station and the base station use the message authentication code mode subfield to select at least one message authentication scheme among such message authentication code modes. The authorization policy support subfield has Field Type 3, and accordingly the subfield is defined as 25.3 Type involving the security negotiation parameters field and has a 1-byte length.

Herein, the short-HMAC message authentication code mode may be applied for the messages used on the handover, that is, MOB_SLP-REQ/RSP, MOB_SCAN-REQ/RSP, MOB_MSHO-REQ, MOB_BSHO-REQ/RSP, MOB_HO-IND, and RNG-REQ/RSP messages.

Among the 1 byte of such a message authentication code mode subfield, the effective bits are given as from 0-th (Bit#0) to 4-th (Bit#4) bits and other bits Bit#5 to Bit#7 are not used and are set as 0.

Here, the 0-th bit (Bit#0) indicates a HMAC mode, a first bit (Bit#1) indicates a CMAC mode, a second bit (Bit#2) indicates a 64-bit short-HMAC mode, a third bit (Bit#3) indicates a 80-bit short-HMAC mode, a 4-th bit (Bit#4) indicates a 96-bit short-HMAC mode, and it is indicated that the corresponding message authentication code mode is supported when the respective bits (from Bit#0 to Bit#4) are set as 1.

Therefore, when the subscriber station is performing the initial network entry process, the subscriber station sets the message authentication code modes to be supported during the authentication process of the initial network entry process as 1 through the two bits (from Bit#0 to Bit#1) of the subfield, and sets unsupportable message authentication code modes as 0.

In addition, the subscriber station informs the applicable message authentication code modes for the messages used to perform a handover process through the three bits (from Bit#2 to Bit#4) of the subfield to the base station by setting the corresponding bit as 1 and sets the unsupportable message authentication code modes as 0.

Referring to FIG. 1, the subscriber station informs all the supportable message authentication code modes to the base station by transmitting the SBC-REQ message including the message authentication code mode subfield on which all the supportable message authentication code modes are written (S100).

The base station receives the SBC-REQ message, and negotiates this parameter by comparing the lower 2 bits (from Bit#0 to Bit#1) of the received message authentication code mode subfield with base station-supportable message authentication code modes.

The base station transmits the negotiated message authentication code mode to the subscriber station by transmitting the SBC-RSP message (S110) including the subfield on which the above-negotiated message authentication code mode is written to the subscriber station. At this time, the lower 2 bits (from Bit#0 to Bit#1) of the received message authentication code mode subfield included in the SBC-RSP message (S110) indicate the message authentication code modes to be used for the messages defined in other processes excluding the network re-entry process or a handover process of the subscriber station, next bits (from Bit#2 to Bit#4) indicate a message authentication code mode to be used in the message defined in the network re-entry process or handover process of the subscriber station, and other bits (from Bit#5 to Bit#7) are set as 0.

The subscriber station and the base station may support at least one message authentication code mode. When the subscriber station and the base station are negotiated to support only one message authentication code mode, the corresponding message authentication code mode must be used when two nodes communicate control messages. On the contrary, when the subscriber station and the base station support at least one message authentication code mode, one of the negotiated message authentication code modes is always used when two nodes communicate control messages.

The message authentication function may be omitted, particularly when better system performance enhancement is required according to the service provider policy of the wireless portable Internet system. At this time, all values of the message authentication code mode subfield included in the SBC-RSP message (S110) that the base station transmits to the subscriber station are set as 0. That is, the base station informs the subscriber station that the message authentication function is omitted depending on the service provider policy by setting 0 for all the bits of the message authentication code mode subfield that the base station transmits to the subscriber station.

Meanwhile, when the message authentication code mode subfield exists in the SBC-REQ message (S100) that the subscriber station transmits to the base station, there must be a message authentication code mode subfield in the SBC-RSP message (S110) that the base station transmits to the subscriber station in response to this message.

When there is no message authentication code mode subfield in the SBC-REQ message (S100) that the subscriber station transmits to the base station, the subscriber station supports only the message authentication scheme using only the HMAC mode. In this case, there may be no message authentication code mode subfield in the SBC-RSP message (S110) which the base station transmits to the subscriber station. If there is no message authentication code mode subfield in the SBC-RSP message, the message authentication code mode negotiated between the subscriber station and the base station is the HMAC-based message authentication code mode. When there is message authentication code mode subfield in the SBC-RSP message (S110) that the base station transmits to the subscriber station, it is written and transmitted that the HMAC-based message authentication code mode is negotiated or the message authentication function is not supported. The 0-th bit (Bit#0) set as 1 is transmitted when the HMAC-based message authentication code mode is negotiated, and all the bits are transmitted and set as 0 when the message authentication function is omitted.

The subscriber station and the base station perform the communicated control message authentication function therebetween according to the message authentication code modes shared therebetween. When both the subscriber station and the base station receive a control message using a not-negotiated message authentication code mode, the subscriber station or the base station does not perform the corresponding control message authentication process, but discards the received message.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention, effects are given as follows.

First, corresponding parameters are easily managed by including various security-related parameters in one security negotiation parameters field.

Second, the subscriber station and the base station can negotiate various PKM version authentication protocols by providing a PKM version support subfield.

Third, the subscriber station and the base station flexibly make various authorization policies by providing an authorization policy support subfield. In addition, the service provider of a wireless portable Internet system can more easily manage the authentication function by providing a final decision for selecting authorization policy to the base station.

Fourth, the base station can perform a robust authentication function using the negotiated various authorization policies.

Fifth, the authentication function may be omitted when the service provider of the wireless portable Internet system considers system performance enhancement.

Sixth, the subscriber station and the base station can perform a message authentication function in various manners by providing the message authentication code mode field. In addition, the service provider of the wireless portable Internet system can more easily manage a message authentication function when the wireless control message is communicated by providing a final decision for selecting the message authentication code mode to the base station.

Seventh, the control message authentication function may be omitted when the service provider of the wireless portable Internet system considers system performance enhancement.

What is claimed is:

1. A method of negotiating security capabilities in a subscriber station, the method comprising:
   generating a request message including privacy key management (PKM) version support information, authorization policy support information, message authentication code mode information, and packet number (PN) window size information; and
   transmitting the request message to a base station,
   wherein the authorization policy support information includes a plurality of bits, one bit of the plurality of bits indicating whether an Extensible Authentication Protocol (EAP)-based authorization is supported at an initial network entry, and
   indicates that the EAP-based authorization and a Rivest Shamir Adleman (RSA)-based authorization are not supported at the initial entry and reentry, respectively, if all of the bits are 0.

2. The method of claim 1, wherein the request message is a subscriber station basic capability negotiation request (SBC-REQ) message.

3. The method of claim 1, wherein the PKM version support information includes information indicating whether PKM version 2 is supported by the subscriber station.

4. The method of claim 1, wherein the message authentication code mode information includes information indicating whether a hashed message authentication code (HMAC) is supported by the subscriber station.

5. The method of claim 1, wherein the PN window size information is size capability information of PN window size per a Security Association IDentifier (SAID).

6. The method of claim 1, wherein the authorization policy support information includes information that the subscriber station cannot support any authorization.

7. The method of claim 1, wherein another one of the plurality of bits indicates whether an EAP-based authorization is supported at the reentry.

8. The method of claim 1, wherein the message authentication code mode information includes a plurality of bits, and
one bit of the bits indicates whether a cipher-based message authentication code (CMAC) is supported or not.

9. The method of claim 8, wherein the message authentication code mode information indicates that no message authentication code is applied if all of the bits are 0.

10. A method of negotiating security capabilities in a base station, the method comprising:
generating a response message including privacy key management (PKM) version support information, authorization policy support information, message authentication code mode information, and packet number (PN) window size information; and
transmitting the response message to a subscriber station,
wherein the authorization policy support information includes a plurality of bits, one bit of the plurality of bits indicating whether an Extensible Authentication Protocol (EAP)-based authorization is supported at an initial network entry, and
indicates that the EAP-based authorization and a Rivest Shamir Adleman (RSA)-based authorization are not applied at the initial entry and reentry, respectively, if all of the bits are 0.

11. The method of claim 10, wherein the response message is a subscriber station basic capability response (SBC-RSP) message.

12. The method of claim 10, wherein the PKM version support information includes information indicating whether PKM version 2 is supported by the base station.

13. The method of claim 10, wherein the message authentication code mode information includes information indicating whether a hashed message authentication code (HMAC) is supported by the base station.

14. The method of claim 10, wherein the PN window size information is size capability information of PN window size per a Security Association IDentifier (SAID).

15. The method of claim 10, wherein the message authentication code mode information includes information indicating that no message authentication code is applied.

16. The method of claim 10, wherein the message authentication code mode information indicates that no message authentication code is applied if all of the bits are 0.

17. The method of claim 10, wherein another one of the plurality of bits indicates whether an EAP-based authorization is supported at the reentry.

18. The method of claim 10, wherein the message authentication code mode information includes a plurality of bits, and
one bit of the bits indicates whether a cipher-based message authentication code (CMAC) is supported.

19. The method of claim 18, wherein the authorization policy support information includes information indicating that no authorization is applied.

* * * * *